April 9, 1957   E. PREISWERK ET AL   2,788,337
METHOD OF PREPARING RAPID-HARDENING ARTIFICIAL
RESIN COMPOSITIONS CONTAINING HARDENING AGENTS
Filed April 28, 1953
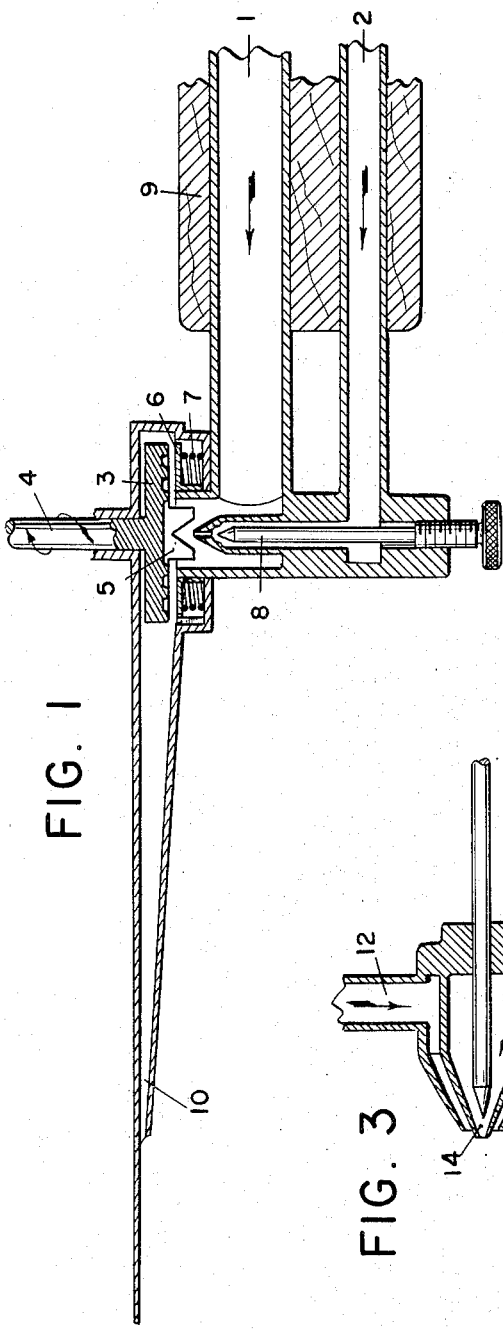
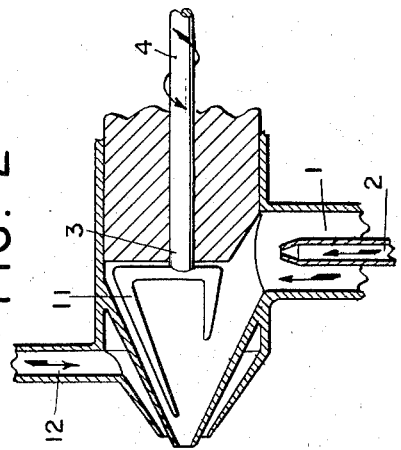
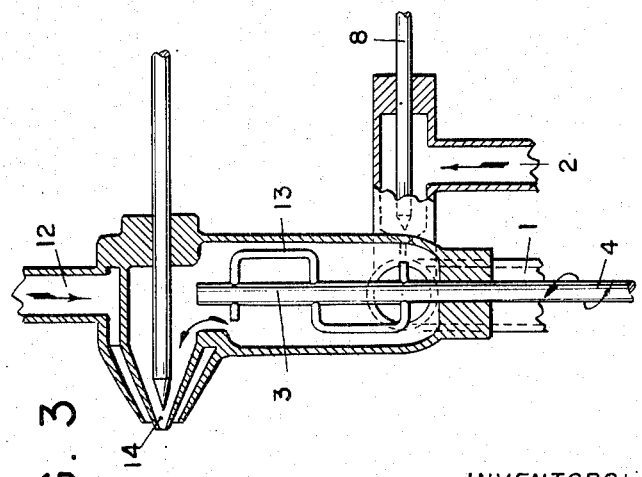
INVENTORS:
Eduard Preiswerk,
Konrad Meyerhans,
Otto Ernst,
Edwin Denz, &
Alfred Juchli,
BY
ATTORNEYS

2,788,337

METHOD OF PREPARING RAPID-HARDENING ARTIFICIAL RESIN COMPOSITIONS CONTAINING HARDENING AGENTS

Eduard Preiswerk, Riehen, Konrad Meyerhans, Neuallschwil, Otto Ernst, Pfeffingen, Edwin Denz, Neuallschwil, and Alfred Juchli, Basel, Switzerland, assignors to Ciba Limited, Basel, Switzerland, a Swiss firm Application April 28, 1953, Serial No. 351,588

Claims priority, application Switzerland April 30, 1952

1 Claim. (Cl. 260—37)

Rapid-hardening artificial resin compositions containing a hardening agent have acquired considerable importance in industry, for example, as binding agents, coating compositions, lacquers, casting compositions and the like. The short hardening period of such compositions affords the advantage that time is saved in the working up of the compositions after they have been applied, but they have the disadvantage that the user must take into account the short useful life of such compositions, that is to say, on account of their progressive hardening, these compositions which have not been used cannot be stored for use at a later time. This means that time may be lost in making up small amounts of the artificial resin compositions or, if unforeseen interruptions occur in using the compositions, large amounts of the compositions may be lost owing to hardening.

Methods and devices are known in which the artificial resin and the hardening agent are continuously supplied separately in controlled proportions to a mixing nozzle, so that mixing occurs merely by the flowing together of the components immediately they issue from the nozzle. However, it has been found that this method of mixing is not satisfactory or even fails, if at least one of the components to be mixed together is present in a highly viscous or pasty condition.

The present invention provides a method of preparing a rapid-hardening artificial resin composition containing a hardening agent, in which the artificial resin and the hardening agent in a flowable condition are continuously withdrawn by mechanical means from separate receptacles in constant relative proportions, and supplied to a mixing device and mixed together. The method is characterized in that the artificial resin and the hardening agent, which may or may not contain known additions, are used in a substantially bubble-free condition, and the withdrawal, supply and especially the mixing are carried out in the absence of a gaseous phase, and the mixing operation to produce the rapid-hardening artificial resin composition is carried out immediately before the composition issues from the mixing device with the aid of at least one movable element.

The method of the present invention ensures that the bubble-free artificial resin composition to be used shall be very uniform, and is especially advantageous in that it enables the mixing device to be relatively small so that at all times during the working of the artificial resin composition only a comparatively small amount of the finished hardenable mass is present. Consequently, the work can be interrupted at any time without fear of incurring the loss of large amounts of unused composition. However, the components can be mixed together immediately before they are required for use, that is to say, at the position in which the composition is to be worked up, so that the method is practically independent of the useful life of the finished composition. The use of a relatively small mixing device, owing to its small weight and small dimensions, enables the hardenable artificial resin composition to be applied easily in places difficult of access.

In order to impart a suitable flowable condition to the components to be mixed together there may be added thereto a suitable, advantageously non-volatile, solvent and/or the finished hardenable mass or the resin components at any stage before they are mixed together may be heated, in which case the hardening period can be shortened. Alternatively, it may be of advantage to cool the components or the finished hardenable artificial resin composition, and this is not difficult in the method of this invention.

In order to render free from bubbles the components to be mixed together it may be of advantage to free the components from bubble-forming substances by subjecting them to reduced pressure, if desired at a raised temperature, for example, before or after they have been introduced into the receptacles.

For certain purposes it may be desirable to incorporate in at least one of the components to be mixed together suitable known organic or inorganic additions, for example, filling materials such as ground shale, kaolin, metal powder, pigments, or plasticisers, dyestuffs, or other modifiers. It is within the competence of an expert, depending on the purpose for which the artificial resin composition is to be used, to incorporate therein whatever additions may seem to him to be suitable at any stage in the production of such a composition.

It is obvious that a clear and general distinction between rapid hardening and slow hardening articial resin compositions is impossible. According to the present invention, which is applicable without difficulty to moderately rapid-hardening or even slow-hardening compositions, there are to be regarded as rapid-hardening masses those compositions which exhibit the particular advantages of the present process as mentioned hereinbefore; this is especially the case when at least one of the components to be mixed is present in a difficultly flowable condition, i. e. in a paste-like or highly viscous condition. As paste-like condition there may be understood the property of the mass not to undergo deformation under the influence of a force lying below the threshold-value, whereas the highly viscous condition may be indicated by the usual viscosity values and which, according to the present invention, lies above 1000 centipoises (cp.). The particular advantages of the present process are manifest in the case of viscosities above 10,000 cp. and particularly above 100,000 cp., as well as in the case of the paste-like condition of the artificial resin composition.

Among the rapid-hardening artifical resins for use in the present method especially advantageous are those which comprise suitable hardening agents and compounds containing ethylene oxide groups, especially polyglycidyl ethers or mixtures of such compounds, which are obtainable in known manner, for example, by reacting a mononuclear or poly-nuclear polyhydric phenol with epichlorhydrin or dichlorhydrin in the presence of an alkali. Depending on the molecular ratio used there are obtained mixtures of chain-like polyethers of varying lengths and of which the groups at the ends of the chains are predominantly epoxide groups. It is also possible to convert aliphatic polyhydric alcohols and epichlorhydrin with the aid of a condensing agent, such as boron trifluoride, into chlorhydrin ethers which are transformed into epoxide groups by the splitting off of hydrogen chloride by means of an agent of alkaline reaction. Depending on the molecular ratio used and on the reaction conditions there can be obtained at room temperature liquid resins or solid resins which can be converted by heat or by the addition of a suitable solvent into a flowable condition.

As a compound containing ethylene oxide groups there is advantageously used a polyglycidyl ether mixture such as is obtainable, for example, by reacting 1 mol of 4:4'-dihydroxydiphenyl-dimethyl-methane in an alkaline medium with at least 1.2 mols of epichlorhydrin. Especially valuable products are obtained by using more than 2 mols of epichlorhydrin, as in this case flowable products can be obtained even at room temperature, and owing to this property these product are especially advantageous for preparing rapid-hardening artificial resin compositions in accordance with the invention.

As hardening agents which are suitable for use in conjunction with compounds containing ethylene oxide groups or with mixtures of the above kind for preparing rapid-hardening artificial resin compositions, there may be mentioned, for example, polyamines, such as ethylene diamine, dimethylamino-propylamine, diethylene triamine, triethylene tetramine or the like, dicyandiamide, polycarboxylic acid anhydrides, such as phthalic acid anhydride or Friedel-Crafts catalysts such as boron trifluoride, and the like.

Artificial resin compositions prepared with such hardening agents and compounds of the above kind containing ethylene oxide groups, for example, a flowable glycidyl ether mixture obtained by reacting 4:4'-dihydroxydiphenyl - dimethyl - methane with epichlorhydrin, have the advantage, apart from their capacity for rapid hardening, that they harden without the evolution of volatile substances and therefore harden in thick layers without the formation of bubbles. They are also distinguished by the fact that they undergo very little shrinkage during hardening, so that they suffer little reduction in volume. The hardened compositions possess considerable mechanical internal strength and are to a great extent insensitive to the influence of temperature.

The artificial resin compositions, especially when they contain filling materials, are especially suitable, for example, as coating compositions, putty-like masses, artificial resin solder (for use, for example, instead of metal solder), cements or the like, for filling pores, molds, hollow spaces, for smoothing surface irregularities and for making reliefs.

Especially valuable putty-like masses are obtained by using less than 1 part by volume, and advantageously about ½ part by volume, of the hardenable resin composition free from filler for every 1 part apparent volume of loose filler, as in this case the finished unhardened putty-like masses, owing to their consistency, can be applied to a vertical support even in a thick layer without flowing down under their own weight, even when the applied composition, and if desired, the support, are heated, for example, to a temperature of about 100° C. When a filler is incorporated with the artificial resin components in the aforesaid proportions, the resulting mixture is capable of being fed quite well by mechanical means, in spite of possessing the property described above.

By the term "apparent volume" of the filling material is meant the volume of the uncompressed material, that is to say, the volume of the loose heaped-up or at most lightly tapped, therefore not pressed, material, such, for example, as can be obtained in a measuring cylinder having a capacity of 100 cubic centimetres.

A putty-like mass produced in accordance with the invention and of the kind described above is suitable, for example, more especially for plastering welded seams in the construction of motor car bodies, and avoids several disadvantages of the costly tin solder used for this purpose, which has a high specific gravity, may cause damage due to corrosion and in some circumstances does not adhere satisfactorily to the substratum. Furthermore, the outer surface of tin solder is very difficult to form without pores, which, when the surface is subsequently lacquered, cause irregularities in the surface of the lacquer. Putty-like masses composed of thermoplastic artificial resins or nitrocellulose-linseed oil possess other disadvantages not shared by putty-like masses prepared in accordance with the invention, for example, the aforesaid known putty-like masses undergo changes in shape or form or cracks or fissures are formed therein when subjected to the temperatures necessary for baking lacquers, and upon drying they may evolve volatile constituents which means that they must be applied in numerous thin coatings, or they may soften or swell under the action of lacquer solvents.

The preparation of the artificial resin compositions containing a hardening agent can be varied in many ways within the scope of the invention by varying the mechanical auxiliary agents destined for the feeding of the components.

In order to produce a finished hardenable mass having the desired composition it is essential that the various components to be mixed together should be supplied to the mixing device in constant predetermined proportions relatively to one another. In order to attain as short an interaction of the components as possible it is of advantage that they should be brought together only shortly before entering the mixing device or even only in the mixing device. In this way obstruction of the conduits by the hardened mass or by residues of the mass left behind is avoided. These precautions also enable any hardening artificial resin composition still present in the mixing device to be removed in a simple manner before the apparatus is rendered inoperative, for example, after stopping the feed of the artificial resin or the hardening agent the artificial resin composition may be driven out of the mixing device by a component which is still liquid, or artificial resin composition still present in the mixing device may be washed out by means of a suitable liquid after stopping the feed of both the artificial resin and the hardening agent. It is also of advantage to maintain the volume within the apparatus between the place where the components are mixed together and the outlet opening of the mixing device as small as possible, so that at all times during the use of the apparatus only a relatively small amount of the hardenable resin composition is present.

In one form of the method of the invention the feeding means are constructed in known manner as pressure cylinders having movable pistons. The pistons may be moved in the cylinders, for example, by mechanical or hydraulic pressure. Furthermore the pistons are coupled together mechanically so as to ensure that the components issue from the feeding means in constant proportions relatively to one another. This can be brought about by arranging that the dimensions of the various cylinders shall vary in a certain ratio, that is to say, the volumes of their strokes must correspond to the percentages in which the components being fed are to be mixed together. The latter may be supplied to the mixing device, for example, by means of flexible pipes. At suitable compositions, for example, in association with the feeding means and/or the mixing device, control elements such as valves, cocks, switches or the like may be provided to regulate the flow of the components to the mixing device or the discharge of the hardenable artificial resin composition from the mixing device. An intermittent discharge of the composition from the mixing device may be brought about, for example, by means of an outlet valve which may be controlled automatically.

The mixing device itself is so constructed that the components fed thereto are intimately mixed together by means of at least one movable element, for example, a rotating disc provided with grooves, a suitable stirrer or a vibrating element. It is of advantage to drive the rotating element by means of a motor fixed directly on the mixing apparatus or, for example, by means of a flexible shaft connected to a motor, and to provide the mixing device with a handle to facilitate manipulating the device.

The finished rapid-hardening artificial resin composition issues from the mixing device through an outlet opening suited for the various methods of applying the composition, for example, through a nozzle, slit or the like, if desired, in conjunction with a suitable distributing device, for instance, a spatula or the like. In order to ensure uniform local distribution of the artificial resin composition during its application it may be of advantage to combine the outlet opening or the distributing device with a vibrator. By providing the outlet opening of the mixing apparatus with a suitable means for supplying compressed air the apparatus can be adapted for spraying the hardenable artificial resin composition. Even viscous liquid or paste-like compositions hardened practically free from pores, even when they are applied in this manner in a relatively thick layer to a support.

In Figs. I to III of the accompanying drawings there are shown in section examples of apparatus suitable for carrying out the present invention. It will be understood that other arrangements or modifications of the constructions shown in the figures fall within the scope of the invention. Thus, for example, a further separate supply may be provided for additions of the kind referred to above.

In all the figures 1 denotes the supply conduit for the substantially bubble-free artificial resin, 2 the supply conduit for the substantially bubble-free hardening agent, 3 a stirrer and 4 a driving means.

In Fig. I 3 denotes a rotary disc provided with grooves and 5 is a small stirring plate rigidly connected to the disc 3 for pre-mixing. A pressure plate 6 movable in a vertical direction is pressed by means of a spring 7 against the disc 3. By means of the needle valve 8, shown in the open position, the supply of the hardening agent can be stopped. The mixing device provided with a handle 9 carries a spatula 10 which represents a special form of distributing device.

In Fig. II a stirrer 3 is provided with a stirring arm 11 and 12 represents a supply conduit for compressed air, when this is used.

In Fig. III a stirrer 3 takes the form of an angularly bent rod 13. The needle valve 8 stops the flow of the hardening agent. The outlet valve 14 controls the discharge of the hardenable artificial resin composition from the mixing device. A supply conduit 12 for compressed air is provided.

The following example illustrates the invention, the parts being by weight unless otherwise stated and the relationship of parts by weight to parts by volume being the same as that of the gram to the cubic centimetre:

7.4 parts of dibutyl phthalate are dissolved in 37.1 parts of a polyglycidyl ether mixture which is flowable at 20° C., and the preparation of which is described below. The resulting solution is mixed in a kneading mixer at a temperature of about 50° C. with 55.6 parts of a mixture of filling materials consisting of 37.1 parts of ground shale, 14.8 parts of kaolin and 3.7 parts of aluminium powder. The mixture of filling materials has an apparent volume of about 126 parts by volume. For the purpose of removing any air which has been introduced during the mixing or which adheres to the filling materials, the paste, which is thick and feedable at 20° C., is deaerated at about 90–100° C. and charged into the first storage receptacle. The deaeration may be carried out under reduced pressure, if desired in the storage receptacle itself. In a second storage receptacle is contained triethylene tetramine as hardening agent. Two pressure cylinders having movable pistons mechanically coupled together rigidly serve as feeding devices in association with the two receptacles. The cylinders are of such dimensions that during the positive movement of the two pistons the composition containing filling material and the triethylene tetramine are supplied to a mixing device of the kind described above in the ratio by volume of 100:7.8 or in the ratio by weight of 100:4.5. The finished bubble-free putty-like mass contains, calculated on 1 part apparent volume of filling material about 0.4 part by volume of hardenable resin composition (polyglycidyl ether+dibutyl phthalate+triethylene tetramine) free from filler.

The polyglycidyl ether mixture used in this example is prepared as follows:

228 parts of 4:4'-dihydroxydiphenyl-dimethyl-methane (1 mol) are reacted with 555 parts (6 mols) of epichlorhydrin in an aqueous solution of caustic soda. The resulting polyglycidyl ether mixture is then washed and dried. It is a product flowable at 20° C. and of relatively low molecular weight.

The putty-like mass prepared as described in this example hardens at about 20° C. in 6–8 hours. At that temperature it has a useful life of about 1 hour. At about 100° C. the mass hardens in about 5–15 minutes. The unhardened composition has a consistency such that it will not flow down after application to a vertical support, even at about 100° C. In the hardened-out condition it adheres very well to the support and is of good internal mechanical strength. It can be heated to high temperatures without changing the shape which it has been given and without forming cracks or fissures. The outer surface of the hardened mass is free from pores, can be worked well, for example, by grinding, and is an excellent support for lacquers, especially baking lacquers.

What is claimed is:

A continuous process for producing a rapid-hardening polyglycidyl ether resin composition suitable for direct application at the point of use, which comprises mixing a filler with a hardenable polyglycidyl ether resin flowable at 20° C. and prepared by reacting 4:4'-dihydroxydiphenyl-dimethyl-methane with more than 2 mols of epichlorhydrin, thereafter de-aerating the filler-resin mixture, and then mechanically and separately feeding the mixture and compound which is capable of hardening the resin at 20° C. from separate sources of supply in constant relative proportions to a mixing zone and then to an issuing zone, the mixing zone being positioned immediately before the issuing zone, mixing the components in said mixing zone to blend the components into a substantially bubble-free rapid-hardening polyglycidyl ether resin composition and discharging said composition from said mixing zone through said issuing zone directly to its point of use, the aforesaid operations being carried out subsequently to the de-aeration step in the absence of a gaseous phase, and the proportion of resin to filler being less than 1 part of resin to 1 part of uncompacted filler, said mixture of resin and filler being of a putty-like consistency.

References Cited in the file of this patent

UNITED STATES PATENTS

| | | |
|---|---|---|
| 1,954,005 | Westberg et al. | Apr. 10, 1934 |
| 2,444,333 | Caston | June 29, 1948 |
| 2,478,013 | Roddy | Apr. 2, 1949 |
| 2,513,382 | Turnbow | July 4, 1950 |
| 2,517,261 | Veitch | Aug. 1, 1950 |
| 2,528,933 | Wiles | Nov. 7, 1950 |
| 2,540,146 | Stober | Feb. 6, 1951 |
| 2,553,718 | Newey et al. | May 22, 1951 |
| 2,592,709 | Kinnaird | Apr. 15, 1952 |
| 2,674,589 | Coleman et al. | Apr. 6, 1954 |

OTHER REFERENCES

Narracott: The Industrial Chemist, vol. 27, September 1951, pages 410–413.